United States Patent

[11] 3,537,531

[72] Inventors Raymond C. Fischer;
Otto E. Johnson, Hinsdale; Gerald J. Tiedt,
La Grange, Illinois
[21] Appl. No. 746,986
[22] Filed July 23, 1968
[45] Patented Nov. 3, 1970
[73] Assignee Internatinal Harvester Company
Chicago, Illinois
a corporation of Delaware

[54] AUTOMATIC GUIDANCE APPARATUS FOR VEHICLES
8 Claims, 6 Drawing Figs.
[52] U.S. Cl. .................................................. 172/26
[51] Int. Cl. ............................................. A01b 69/00
[50] Field of Search .......................................... 172/6, 26;
180/79, 82; 280/87.2

[56] References Cited
UNITED STATES PATENTS
1,113,494 10/1914 Schlicht ....................... 172/26

| | | | |
|---|---|---|---|
| 1,390,419 | 9/1921 | Zybach .......................... | 172/26X |
| 1,980,553 | 11/1934 | Salisbury ....................... | 172/26X |
| 2,509,914 | 5/1950 | Goodwine ..................... | 172/26X |
| 3,402,784 | 9/1968 | Roberson et al. ............. | 172/6X |

Primary Examiner—Robert E. Pulfrey
Assistant Examiner—James W. Peterson
Attorney—Noel G. Artman ABSTRACT: An agricultural machine includes earthworking and tractive vehicle components, the vehicle component having a forward steerable wheel steered in relation to a guide line such as a furrow wall. A sensing device bearing against the furrow wall is sensitive to relative movement between the device and the steerable wheel, and actuates the steering mechanism to bring the front end of the machine and the sensing device back to a normal operating relation. To compensate for lateral drift of the rear portion of the machine particularly in sidehill operation, another sensing device at the rear of the machine independently actuates the power steering to adjust the position of the vehicle and overcome the effects of sidehill drift.

Patented Nov. 3, 1970
3,537,531
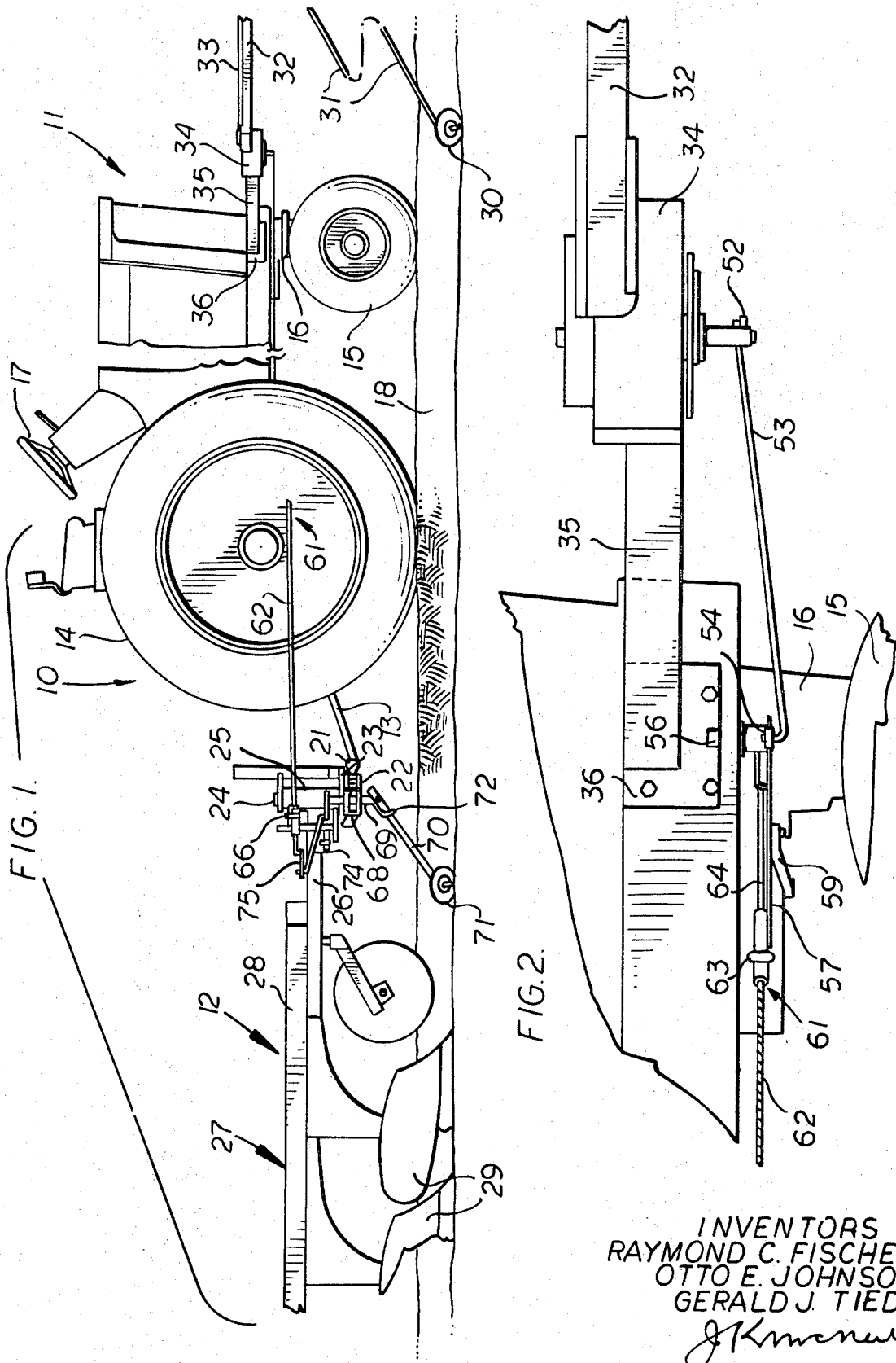
INVENTORS
RAYMOND C. FISCHER
OTTO E. JOHNSON
GERALD J. TIEDT
ATT'Y

INVENTORS
RAYMOND C. FISCHER
OTTO E. JOHNSON
GERALD J. TIEDT

ATT'Y

INVENTORS
RAYMOND C. FISCHER
OTTO E. JOHNSON
GERALD J. TIEDT

ATT'Y

INVENTORS
RAYMOND C. FISCHER
OTTO E. JOHNSON
GERALD J. TIEDT

ATT'Y 3,537,531

1

AUTOMATIC GUIDANCE APPARATUS FOR VEHICLES

BACKGROUND OF THE INVENTION

This invention relates to agricultural machines and particularly to automatic guidance means therefor. More specifically, the invention concerns guidance means for a tractor and plow combination.

Automatic guidance means for implement propelling tractors wherein a sensing device or feeler travels alongside the tractor and bears, for example, against a furrow wall and transmits corrective steering signals to the tractor upon deflection of the sensing device, are old. Such a device is described and illustrated in U.S. Pat. No. 3,402,784 filed Aug. 19, 1966. Such devices have been successful under most conditions, but when operating on sidehills with a tractor drawn plow or the like they have failed to compensate for the tendency of the rear end of the machine, either tractor or plow or both, to drift laterally relative to the line followed by the steering wheel and the sensing device. Therefore, the present invention has for its object the provision of novel automatic guidance means for a tractor and implement combination including sensing means which is sensitive not only to change in direction of a selected guide line but also to lateral drifting of the rear end of the machine relative to its draft line or said guide line.

Another object of the invention is the provision of guidance means for the steerable front wheels of an agricultural machine responsive to a guide line and additional guidance means compensating for side drift of the rear portion of the machine such as occurs when operating on hillsides.

DESCRIPTION OF THE DRAWINGS

FIG. 1 is a diagrammatic side elevation with parts removed of an agricultural machine in the form of a tractor-plow combination on which is mounted automatic guidance mechanism incorporating the features of this invention;

FIG. 2 is an enlarged detail in side elevation of a portion of the guidance mechanism at the forward end of the machine and as indicated in FIG. 1;

DESCRIPTION OF THE PREFERRED EMBODIMENT

Figure 3:
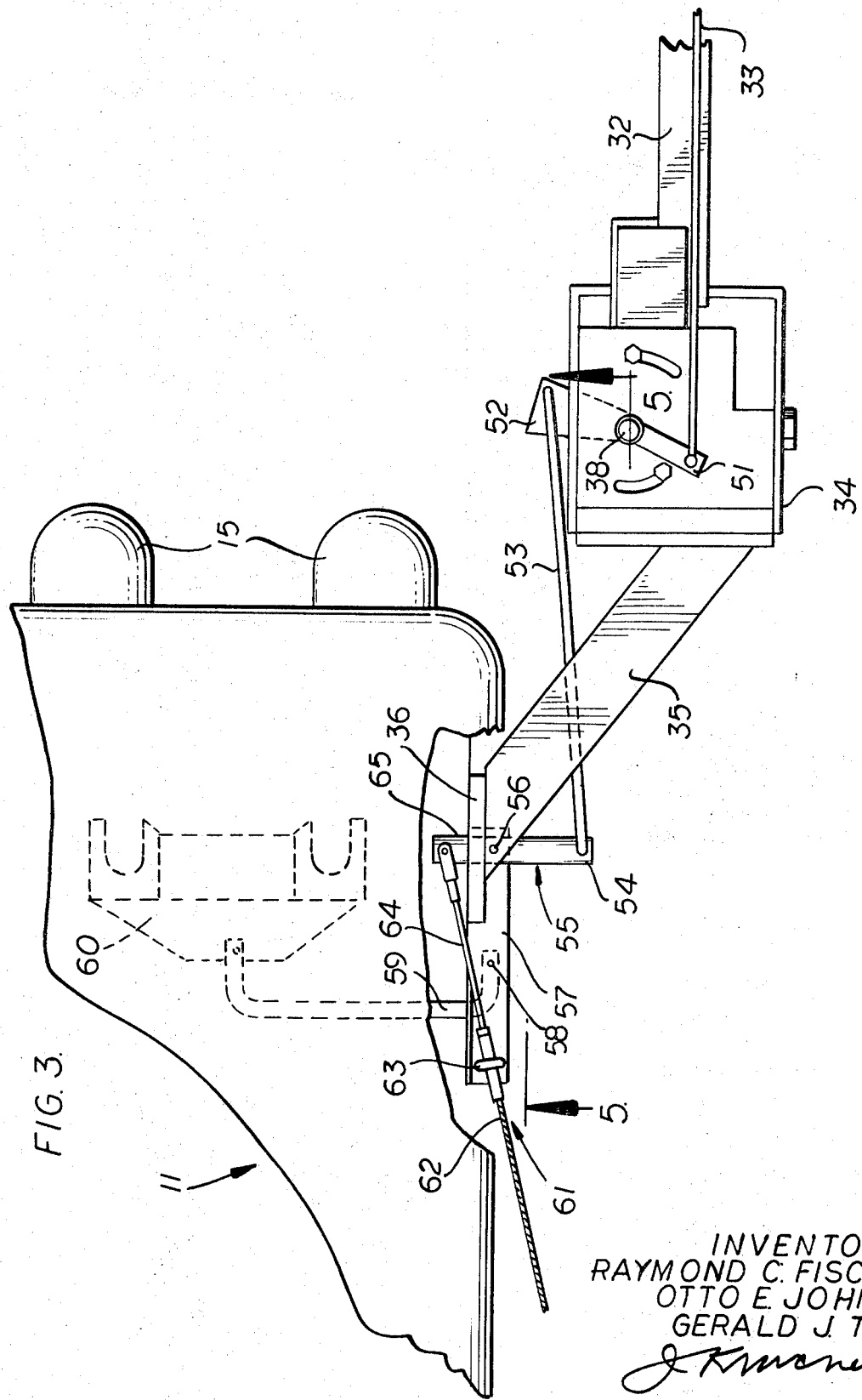
FIG. 3 is an enlarged detail in plan, with parts removed of the structure shown in FIG. 2.

In the drawings the numeral 10 designates an agricultural machine having a forward tractive vehicle component 11 and a rear connected earthworking component in the form of a moldboard plow 12 connected to the vehicle component or tractor by links 13.

The tractor may take any suitable form, but is illustrated as having laterally spaced rear drive wheels 14 and a pair of steerable front wheels 15 supported by a rotatable vertical post 16 rotated to steer the front wheels by any suitable power operated steering means, not shown, controlled by the tractor operator through steering mechanism 17.

The plow 12, only the forward portion of which is shown, is a conventional moldboard plow, for example of the semimounted type, adapted to establish a furrow wall 18 which serves as a guide line for the machine as it traverses the field. A draft line is established for the machine by the connection between the vehicular and earthworking components. It may be understood that the links 13 are the lower links of a conventional tractor three-point hitch and may be raised and lowered through lift links 19 the upper ends of which are connected to rock arms 20 mounted on the tractor and operated preferably by hydraulic power to raise the front end of the plow.

2

The rear ends of links 13 are pivotally connected to lugs 21 secured to a crossbar 22 to which is affixed a plate 23 carrying an upstanding spindle 24 upon which is pivotally received a bearing 25 carried by a transverse rail 26 forming part of the plow frame 27, one end of rail 26 being bent rearwardly and secured to the forward end of a diagonal supporting beam 28 upon which are mounted a plurality of plow bottoms 29. The draft load of the plow is taken on the spindle 24 which accommodates lateral swinging movement of the plow relative to the tractor.

The automatic guidance mechanism of this invention includes a forwardly disposed sensing device in the form of a disc 30, shown in FIG. 1, engageable with the furrow wall 18 and carried at the end of a downwardly and rearwardly extending rod 31 mounted in a manner, not shown, at the end of a forwardly directed boom 32 and operatively connected by linkage such as that shown and described in the U.S. Pat. No. 3,402,784 filed Aug. 19, 1966, referred to above, to a rod 33. Rod 31 is biased inwardly to hold disc 30 against the furrow wall, and movement of sensing disc 30 relative to the steerable wheels 15 due to veering of the furrow wall 18, for example, results in longitudinal movement of rod 33.

Boom 32 is secured to and extends forwardly from a housing 34 supported at one end of a bracket 35 the other end of which is affixed to a plate 36 secured to the forward end of tractor 11. In housing 34 is mounted an electrical signal transmitting mechanism operated in response to the movement of rod 31 and disc 30 relative to the tractor, electric current being derived from a source of electricity of any well known form, not shown, carried by the tractor and operatively connected to the power operated steering mechanism of the tractor to turn the tractor wheels 15 to the left or to the right to effect corrective steering and return the tractor wheels to the selected position relative to furrow wall 18.

Electrical switch and switch-actuating means is indicated by the numeral 37 and includes a vertical shaft 38 rotatable in a sleeve 39 which is rotatably mounted in housing 34, shaft 38 having affixed thereto a main plate 40 to which are secured a pair of vertically offset plates 41 and 42 upon which are mounted left- and right-hand electrical switches 43 and 44, respectively.

Switches 43 and 44 are provided with spring closure fingers 45 and 46, respectively, having hook ends, and actuation of these switches is effected by the provision of a cam 47 affixed to the upper end of sleeve 39 and having actuating lobes 48 and 49 engageable with the hook ends of fingers 45 and 46.

Should the furrow wall 18 veer to the right, for example, movement of rod 31 outwardly against its bias will move rod 33 forwardly. The rear end of rod 33 is connected by pivot pin 50 with an arm 51 secured to the upper end of shaft 38. Thus, forward movement of rod 33 rotates shaft 38 and switch carrying plate 40 counterclockwise. Rotation of plate 40 counterclockwise causes the end of spring finger 46 to ride upon cam lobe 49 and close switch 44 directing a signal to the power steering mechanism of the tractor to turn wheels 15 to the right, toward the furrow.

An "intermediate control system is mounted on the tractor rearwardly of housing 34 wherein an" arm 52 is affixed to the lower end of sleeve 39 and is apertured to receive the downwardly bent end of a link 53, the other end of which is bent upwardly for pivotal connection to an arm 54 of a bellcrank 55 fulcrumed upon a pin 56 mounted on plate 36. One end of a bar 57 is pivoted on pin 56, and medially of its ends at 58 to one arm of a U-shaped link 59, the other end of which is connected to a plate 60 mounted on the rotatable steering post 16 of the tractor.

Upon corrective turning of the tractor wheels 15 to the right bar 57 is swung clockwise, as viewed in FIG. 3, about the axis of pin 56 to which bellcrank 55 is pivotally affixed, swinging arm 54 and link 53 rearwardly.

Arm 54 and bar 57 swing as a unit about the axis of pin 56 due to the presence of a Bowden wire 61 comprising a flexible sheath 62 secured at its forward end to bar 57 by clamp 63 and having a flexible shaft 64 slidably mounted therein and connected to another arm 65 of bell crank 55.

Bellcrank 55, bar 57 and shaft 64 form a relatively rigid triangle pivotable about pin 56 except when shaft 64 is independently telescoped in sheath 62, as will be explained hereinafter.

As pointed out hereinbefore, when operating a machine of this type, particularly on sidehills, the implement component in the form of moldboard plow 12 may tend to drift downhill with respect to the tractor component 11. With respect to FIGS. 1 and 4 if we assume the plow drifting to the right with respect to the tractor, correction must be made in the steering of the tractor to bring the tractor and the implement back to an in-line or normal operating position.

In order to accomplish this the rear end of sheath 62 of Bowden wire 61 is anchored by a clamp 66 to a brace 67 secured to and extending forwardly and laterally from plow rail 26 and supporting at its end a bracket 68 in which is rotatably mounted a vertical spindle 69. The lower end of spindle 69 is bent outwardly and has pivotally mounted thereon the upper end of a supporting rod 70 for a sensing disc 71 engageable with the furrow wall 18 in the manner of the forward disc 30.

Figure 4:
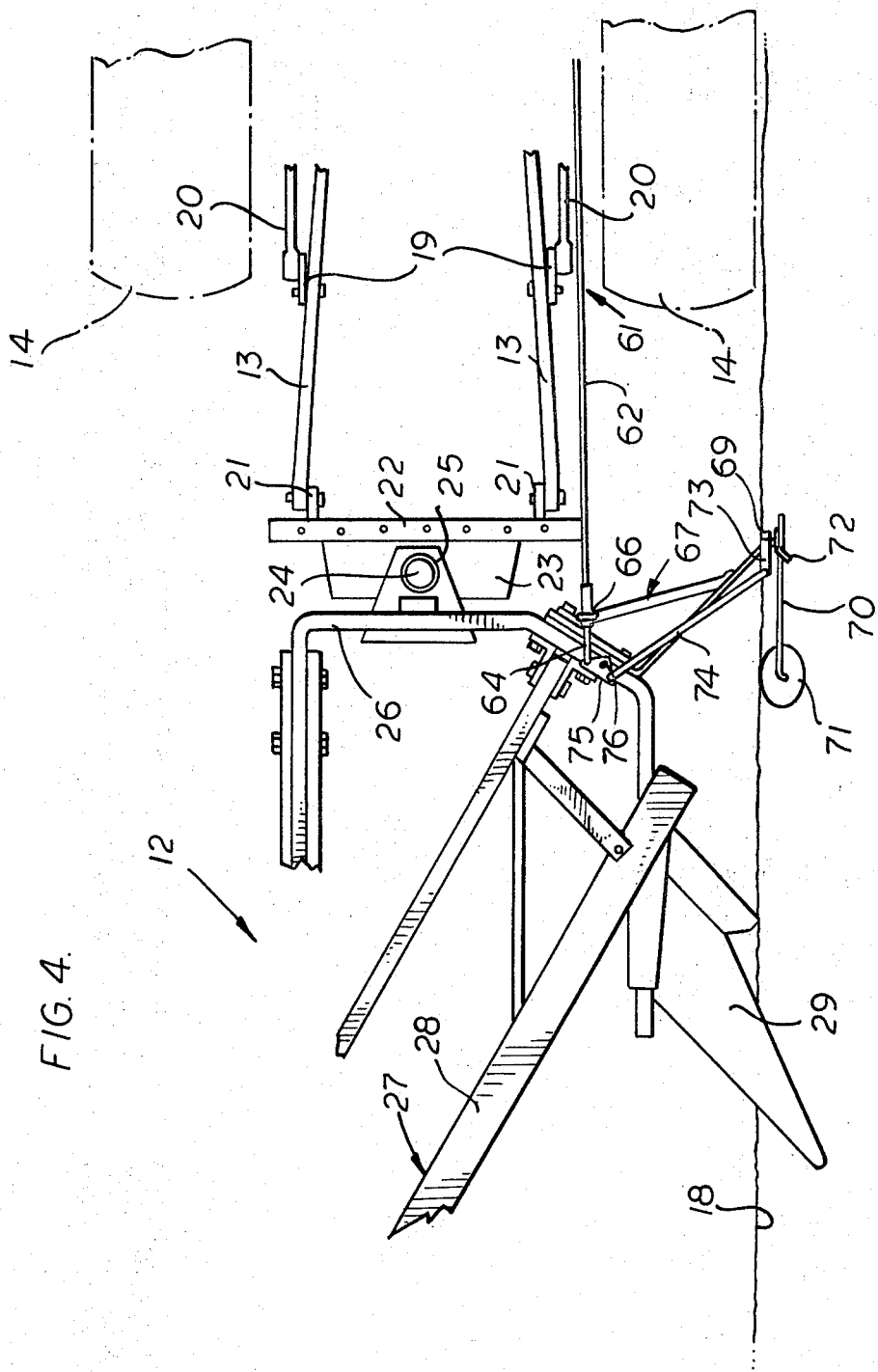
FIG. 4 is an enlarged plan view of a portion of the sensing mechanism at the rear of the machine.
Figure 5:
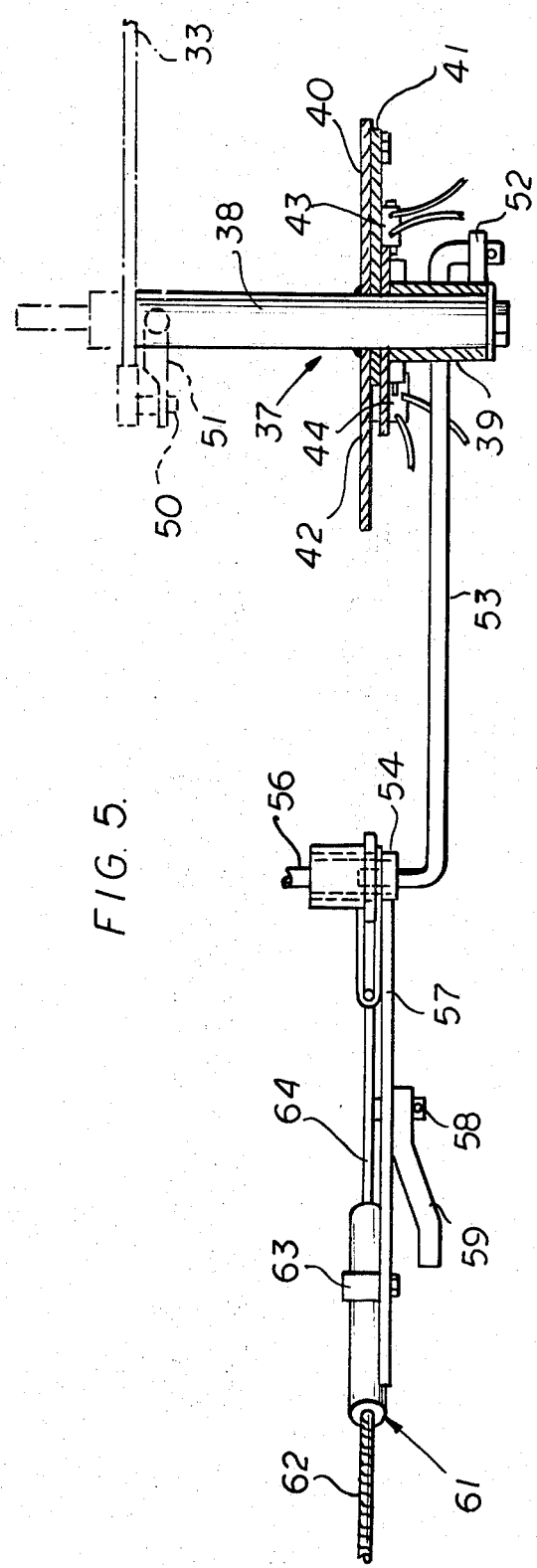
FIG. 5 is an enlarged diagrammatic section taken on the line 5-5 of FIG. 3.

Rod 70 and disc 71 are biased downwardly and inwardly by the provision of a spring 72, one end of which is mounted on the laterally projecting lower end of spindle 69. The upper end of spindle 69 has secured thereto an arm 73 to which is connected one end of a link 74 which may, if desired, be adjustable in length, and the other end of which is connected to one arm of a bellcrank 75, the other arm of which is connected to the rear end of shaft 64 of Bowden wire 61, as shown in FIG. 4.

Figure 6:
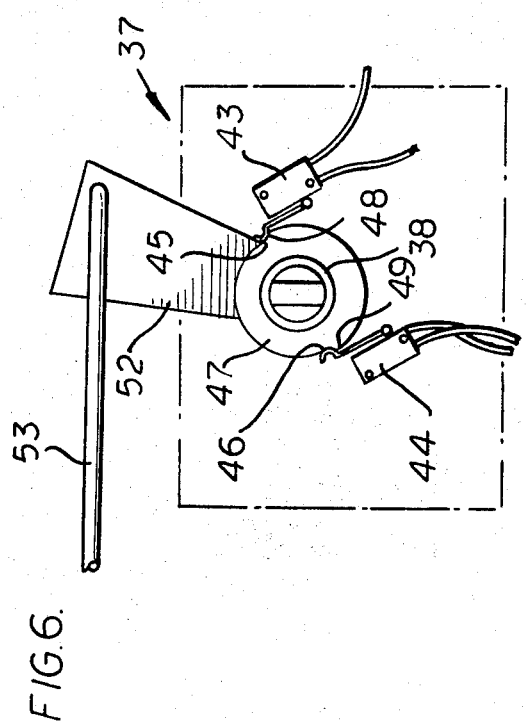
FIG. 6 is a diagrammatic plan view of a pair of cam-actuated switches controlling the operation of the power steering mechanism of the tractor.

In operation, as previously noted with respect to the forward end of the machine, should the furrow wall 18 veer to the right, sensing disc 30 acts in the manner described through switches 43 and 44 to cause steering wheels 15 to correctively turn to the right, clockwise rotation of plate 60 acts through link 59, bar 57 and shaft 64 to swing member 55 clockwise, and through link 53 and arm 52 to revolve cam 47 counterclockwise and restore spring fingers 45 and 46 to the normal inactive position of FIG. 6. This cuts off the steering signal and permits the tractor wheels to proceed in normal spaced relation to furrow wall 18.

With the front end of the machine operating normally with respect to furrow wall 18 and with the steering control switches 43 and 44 in the position of FIG. 6, and if we assume, for example, that the machine is operating on a side hill wherein the tendency for the rear end of the tractor or the plow is to drift to the right, disc 71 will be urged inwardly by spring 72 causing arm 73 and rod 74 to turn bellcrank 75 in a clockwise direction. This moves shaft 64 forwardly in sheath 62 to rock member 55 in a clockwise direction independently of bar 57, revolving cam 47 counterclockwise causing cam lobe 48 to close switch 43 and actuate the power steering of the tractor to correctively steer the tractor wheels to the left to compensate for the side drift of the rear end of the machine. Turning tractor wheels 15 to the left revolves plate 60 counterclockwise and, through connecting link 59, and by virtue of the rigidity of the parts 54, 57, and 64, revolving the latter as a unit about axis 56, and revolving shaft 38 and plate 40 clockwise to again open switch 43 and cancel the steering correction.

It is believed that the construction and operation of the novel guidance mechanism of the present invention will be clearly understood from the foregoing description.

We claim:

1. In an agricultural system including a powered tractive vehicle having power steering means and a forward steerable wheel, a trailing implement pivotally connected to the rear of the tractive vehicle and capable of lateral motion relative to a draft line, the combination of an automatic guidance apparatus for the system comprising; a first sensing means carried by a forward portion of the tractive vehicle in operative relation to an external guide line substantially parallel to the path of said steerable wheel and deflectable from a normal position relative to said steerable wheel, said first sensing means being operatively connected to said power steering means for actuating the latter to adjust said steerable wheel in response to said relative movement of said first sensing means, an intermediate control means operatively connected to said first sensing means and to said steerable wheel, a second sensing means carried by the trailing implement in operative relation to said external guide line and deflectable in response to the lateral motion of the trailing implement relative to said draft line, said second sensing means being operatively connected to said control means and to the power steering means thereby interacting with said first sensing means to adjust said steerable wheel to compensate for said lateral motion of said trailing implement and return the latter to said draft line.

2. The invention set forth in claim 1, wherein the powered tractive vehicle is a tractor and the trailing implement is a plow or the like drawn by the tractor, said guide line being a furrow wall and said first and second sensing means being laterally movable devices yieldably held against the furrow wall.

3. The invention set forth in claim 2, wherein an electric switch member and a switch-actuating member are mounted on the tractor for movement of one relative to the other, said first sensing means being operatively connected to one of said members for moving it relative to the other of said members in response to the deflection of said first sensing means to close said switch member, said switch member being operatively connected to said power steering means to activate the latter to turn the steerable wheel in response to said closing of said switch member.

4. The invention set forth in claim 3, wherein said intermediate control means is responsive to the turning of said steerable wheel to move the other of said members relative to said one of said members to open said switch member and deactivate said power steering means.

5. The invention set forth in claim 4, wherein link means operatively connect said steerable wheel to said other of said members to move the latter relative to said one of said members to open said switch member in response to turning of said steerable wheel.

6. The invention set forth in claim 2, wherein said second sensing means is mounted on a forward portion of the plow and extends forwardly therefrom alongside the tractor for operative connection to said intermediate control means.

7. The invention set forth in claim 6, wherein the connection of said second sensing means to said intermediate control means comprises a flexible thrust member including a flexible sheath and a flexible rod slidable therein extending from the plow to said intermediate control means for transmitting the deflection of said second sensing means thereto.

8. The invention set forth in claim 7, wherein an electric switch member and a switch-actuating member are mounted on the tractor for movement of one relative to the other, said intermediate control means being operatively connected to one of said members for moving it relative to the other of said members in response to the deflection of said second sensing means to close said switch member, said first sensing means being operatively connected to the other of said members to close said switch member in response to the deflection of said first sensing means, said switch member being operatively connected to said power steering means to activate the latter to turn said steerable wheel in response to said closing of said switch member.